(12) United States Patent
Lane et al.

(10) Patent No.: US 10,529,366 B2
(45) Date of Patent: Jan. 7, 2020

(54) SIDEWALL GUIDED DIRECTED SELF ASSEMBLY DATA STORAGE MEDIUM

(71) Applicant: Seagate Technology LLC, Cupertino, CA (US)

(72) Inventors: Austin P. Lane, Austin, TX (US); Xiaomin Yang, Livermore, CA (US); ShuaiGang Xiao, Fremont, CA (US); Kim Yang Lee, Fremont, CA (US); David S. Kuo, Palo Alto, CA (US)

(73) Assignee: Seagate Technology LLC, Cupertino, CA (US)

( * ) Notice: Subject to any disclaimer, the term of this patent is extended or adjusted under 35 U.S.C. 154(b) by 170 days.

(21) Appl. No.: 15/484,647

(22) Filed: Apr. 11, 2017

(65) Prior Publication Data

US 2018/0294007 A1    Oct. 11, 2018

(51) Int. Cl.
*G11B 5/73*    (2006.01)
*G11B 5/82*    (2006.01)
*G11B 5/84*    (2006.01)

(52) U.S. Cl.
CPC .......... *G11B 5/7325* (2013.01); *G11B 5/7379* (2019.05); *G11B 5/82* (2013.01); *G11B 5/8404* (2013.01)

(58) Field of Classification Search
CPC ................................. G11B 5/746; G11B 5/743
USPC ................ 427/127, 128, 129, 130, 131, 132
See application file for complete search history.

(56) References Cited

U.S. PATENT DOCUMENTS

| | | | |
|---|---|---|---|
| 8,673,541 B2 | 3/2014 | Xiao et al. | |
| 9,064,522 B2 | 6/2015 | Kanamaru et al. | |
| 9,269,388 B2 | 2/2016 | Xiao et al. | |
| 9,281,203 B2 | 3/2016 | Chen et al. | |
| 9,299,609 B2 | 3/2016 | Yang et al. | |
| 9,385,136 B2 | 7/2016 | Chen et al. | |
| 2013/0081937 A1 | 4/2013 | Albrecht | |
| 2014/0370442 A1 | 12/2014 | Ober et al. | |
| 2015/0024597 A1* | 1/2015 | Gao | H01L 21/3086 438/694 |
| 2016/0122859 A1* | 5/2016 | Cushen | C23C 14/042 216/49 |

* cited by examiner

*Primary Examiner* — Michael B Cleveland
(74) *Attorney, Agent, or Firm* — Hall Estill Attorneys at Law

(57) ABSTRACT

A data storage medium may have increased data capacity by being configured with first and second patterned pedestals that are each separated from a substrate by a seed layer. A first polymer brush layer can be positioned between the first and second patterned pedestals atop the seed layer and a second polymer brush layer may be positioned atop each patterned pedestal. The first and second polymer brush layers may be chemically different and a block copolymer can be deposited to self-assemble into separate magnetic domains aligned with either the first or second polymer brush layers.

19 Claims, 3 Drawing Sheets

US 10,529,366 B2

SIDEWALL GUIDED DIRECTED SELF ASSEMBLY DATA STORAGE MEDIUM

SUMMARY

A data storage medium, in accordance with some embodiments, has first and second patterned pedestals that are each separated from a substrate by a seed layer. A first polymer brush layer is positioned between the first and second patterned pedestals atop the seed layer and a second polymer brush layer is positioned atop each patterned pedestal. The first and second polymer brush layers are chemically different and a block copolymer is deposited to self-assemble into separate magnetic domains aligned with either the first or second polymer brush layers.

DETAILED DESCRIPTION

Demand for rotating data storage devices with increased data capacity and high data access speeds have rendered bit patterned media (BPM) where data is stored in a predetermined arrangement of data dots. To increase the data capacity of BPM, data dots are more densely arranged. However, fabricating a BPM with data dots arranged on a 10 nm and below scale can be challenging. Hence, various embodiments are directed to BPM that can self-assemble into a plurality of data dots packaged on a 10 nm or lower scale.

Figure 1:
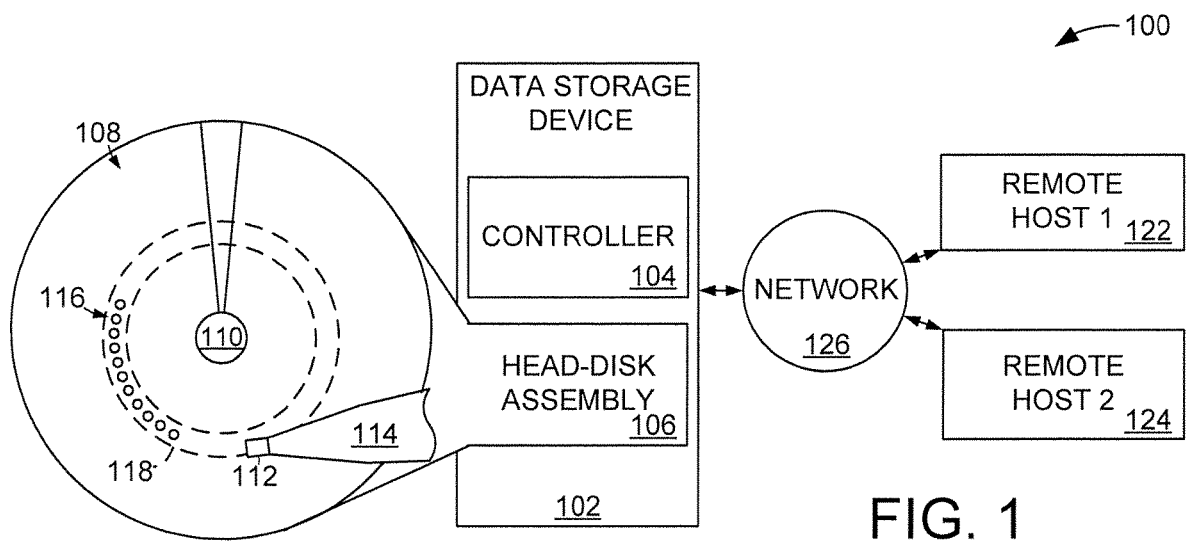
FIG. 1 is a block representation of an example data storage system configured and operated in accordance with some embodiments.

FIG. 1 represents an example data storage system 100 that may employ one or more BPM to temporarily or permanently store data as part of a data storage device 102. It is noted that a data storage system 100 can concurrently and independently utilize any number of data storage devices 102, which may be different types of memory, have different capacities, and access data at different speeds.

In the non-limiting example of FIG. 1, a hard disk drive (HDD) has a local controller 104 that directs data to and from a head-disk assembly 106. The head-disk assembly 106 can have one or more BPM platters 108 mounted to a spindle motor 110 that spins to create an air bearing that separates the respective platters 108 from a transducing head 112. That is, the local controller 104 can direct motion of the platters 108 via the spindle motor 110 and motion of the transducing head 112 via an actuating suspension 114 to position the transducing head over data dots 116 arranged in data tracks 118 of each platter 108.

The transducing head 112 has at least a data writer and data reader that allow the magnetic domain of the data dots 116 to be altered to write data. While each data track 118 has a single row of data dots 116, such configuration is not required as a data track 118 can comprise any number of rows of data dots 116. It is contemplated that each platter 108 incorporates non-user servo data stored in servo regions 120, which may contain data operational data like grey code, error correction code, and position error markers.

Through the utilization of multiple platters 108 and transducing heads 112, the head-disk assembly 106, and data storage device 102, can provide a data storage capacity to one or more remote hosts, such as the first 122 and second 124 shown in FIG. 1. The remote hosts 122/124 can concurrently and independently access the data storage device 102 for temporary or permanent data storage via a wired or wireless network 126. For instance, the first remote host 122 may be a node that utilizes the data storage device 102 as a cache and the second remote host 124 may be a controller configured to supplement the local controller 104 during peak data demand.

Figure 2A:
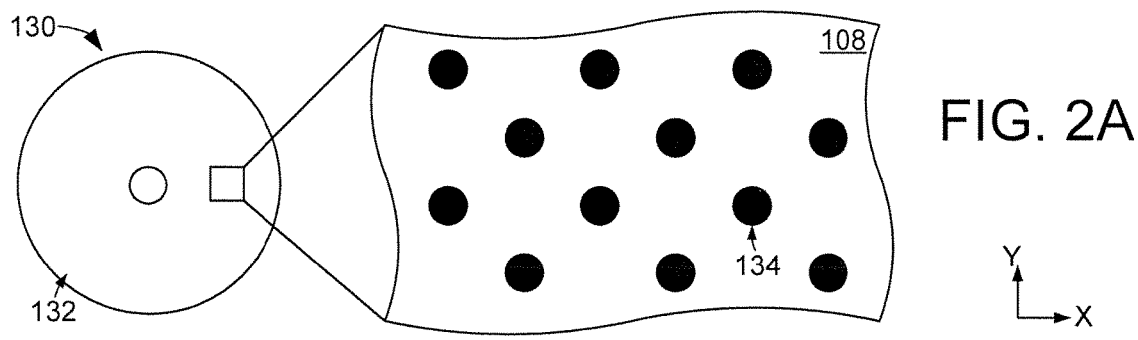
FIGS. 2A-2C respectively display portions of an example data storage medium capable of being used in the data storage system of FIG. 1.
Figure 2B:
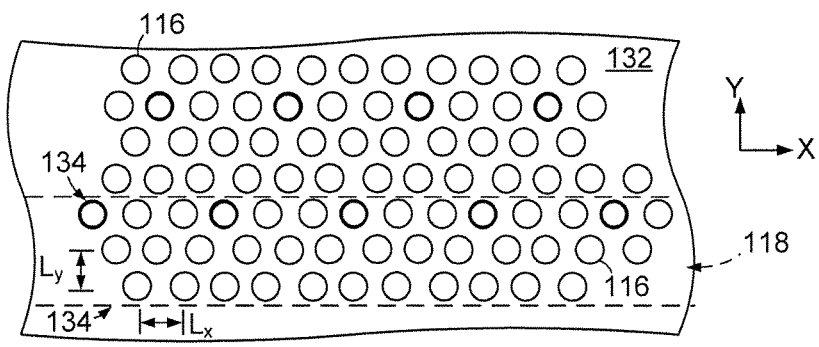
Figure 2C:
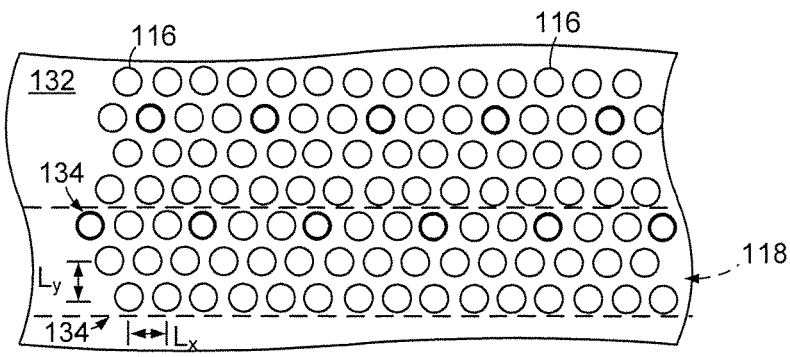

FIGS. 2A-2C respectively display top view line representations of portions of a BPM 130 that can be used in the data storage system 100 of FIG. 1 in accordance with some embodiments. The BPM 130 has a recording surface 132 where a plurality of alignment features 134 are separated by chemically contrasting material. The alignments features 134 are shown with a circular shape in FIG. 2A, but the respective features 134 can be configured in other shapes, such as rectangular, rhomboid, and oval shapes.

In some embodiments, the alignment features 134 are physically raised regions that promote the self-assembly of nanostructures to produce the data dot arrangement of FIG. 2B. As shown, magnetic data dots 116 self-assemble into a pattern based on the chemical composition and physical configuration of the alignment features 134. That is, the distance 136 between alignment features 134, as measured by vectors ($L_x$ & $L_y$), as well as the size and chemical material of the alignment features 134 can determine the data dot pattern after self-assembly.

In the example of FIG. 2B, the data dots 116 arrange into a first pattern with a first density ($Lx=L_y$). The example data dot arrangement of FIG. 2C conveys how the alignment features 134 can produce a second pattern with a second density ($0.866Lx=L_y$). It can be appreciated that the alignment features 134 can provide a multiplication effect where the number of data dots 116 are greater than the number of separate alignment features 134, such as the 2× multiplier of FIGS. 2B and 2C. It is understood that the term "self-assembled" means the autonomous formation of periodic nanostructures upon deposition of self-assembling materials, such as block copolymers. Such self-assembled creation of magnetic data dots 116 can create domain periods of 10 nm or less and areal data density of greater than 1 Terabyte per square inch.

Figure 3:
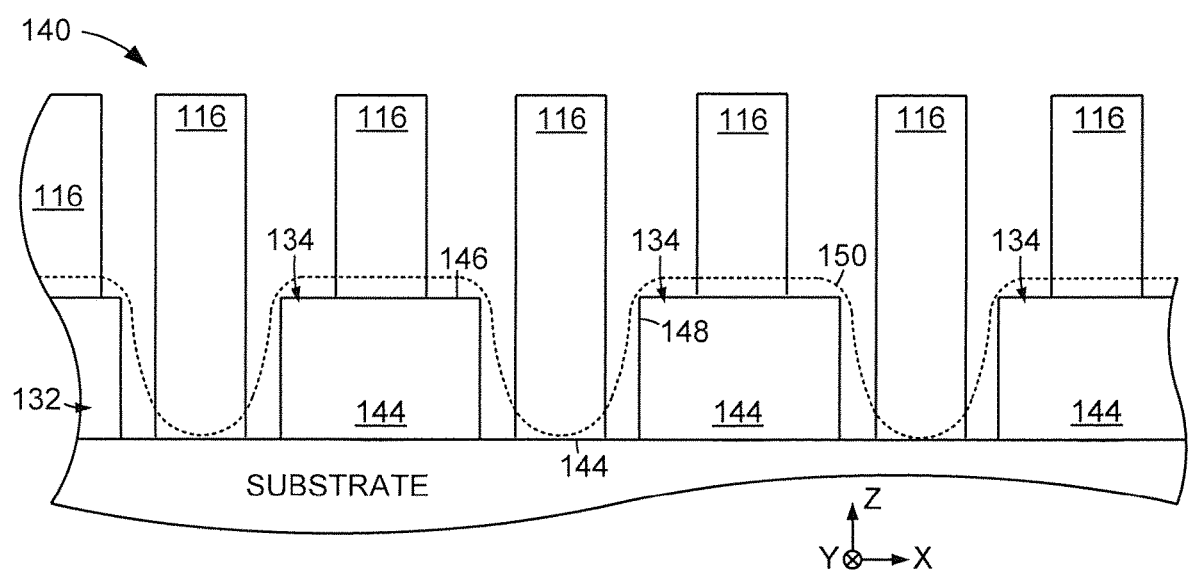
FIG. 3 shows a cross-sectional line representation of a portion of an example data storage medium arranged in accordance with assorted embodiments.

While increasing the proximity of data dots theoretically can be accomplished by decreasing the separation distance 136 between alignment features 134, self-assembled density of data dots 116 with 10 nm or less of non-magnetic material between them is difficult. FIG. 3 depicts a cross-sectional view line representation of a portion of an example BPM 140 that is configured in accordance with some embodiments. A plurality of alignment features 134 are provided by a template layer 142 that vertically separates a first 144 and second 146 fabrication surfaces along the Z axis.

While the vertical separation of the fabrication surfaces 144/146 can allow the feature sidewalls 148 to direct self-assembly of separate magnetic data dots 116 from the respective fabrication surfaces 144/146, construction of alignment features 134 with small separation distances 136 can result in degraded sidewalls 148, as illustrated by segmented line 150, from formation of seed material atop the alignment features 134. In other words, positioning seed material on the first fabrication surface 144 via conventional lithography can narrow the separation of the alignment features 134 by altering the orientation of the sidewalls 148 from perpendicular to the second fabrication surface 146. The deposition of a seed material may further produce an irregular second fabrication surface 146 that makes self-assembly of data dots 116 between alignment features 134 unreliable.

Figure 4A:
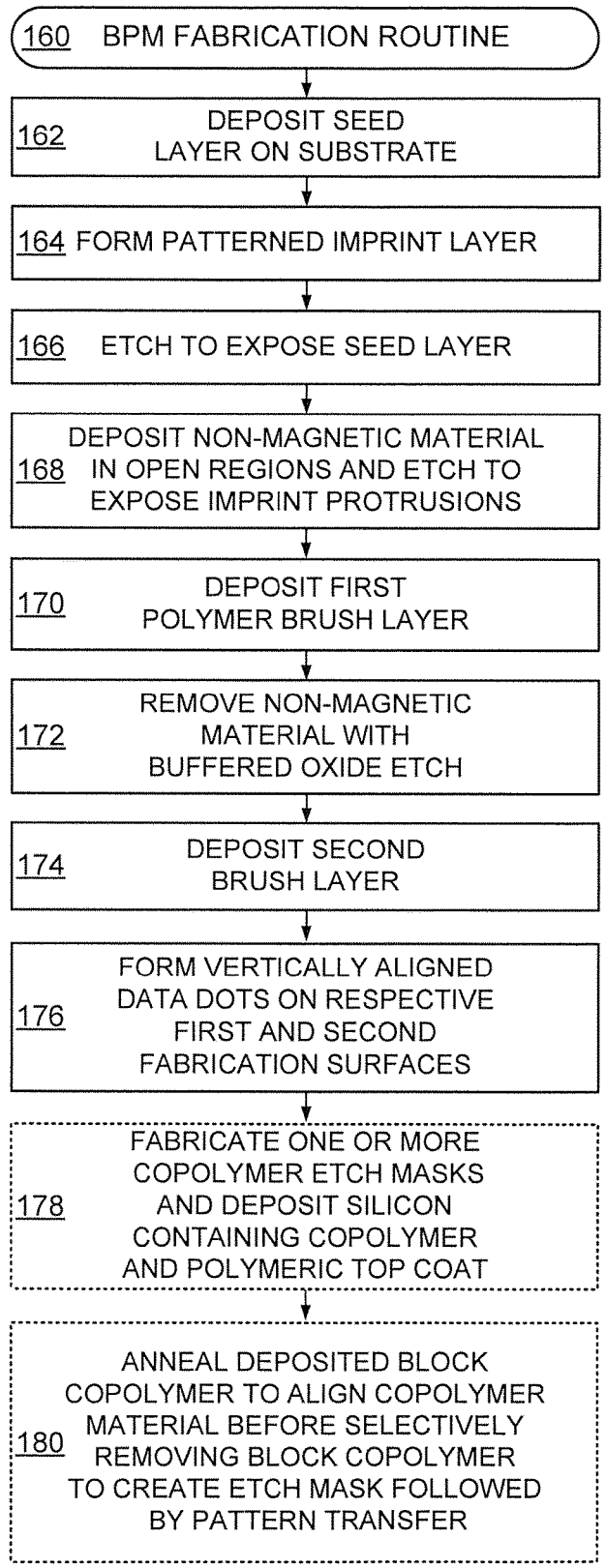
FIGS. 4A and 4B respectively illustrate a flowchart and exemplary representations of an example BPM fabrication routine that can be carried out in accordance with various embodiments.
Figure 4B:
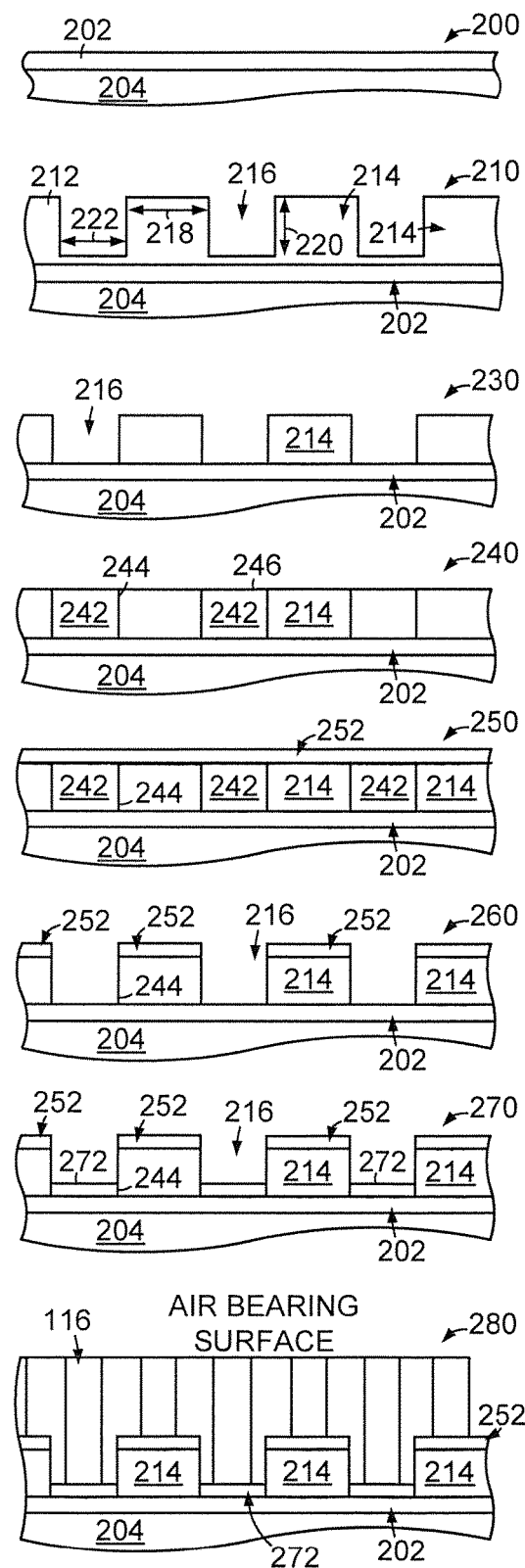

Accordingly, embodiments are directed to structures and methods to optimize self-assembled fabrication of BPM with data dots 116 having an increased density, such as 10 nm or less separation between dots 116. FIGS. 4A and 4B respectively provide a flowchart (4A) and exemplary representation (4B) of an example BPM fabrication routine 160 that is executed in accordance with various embodiments. A seed layer 202 is initially deposited in step 162 onto a substrate 204, as illustrated by medium 200. The seed layer 202 may be any material conducive to grafting polymer brush material, such as chromium, and the substrate 204 may be any rigid material, such as glass, $SiO_2$, or an aluminum alloy. Step 162 may produce a seed layer that continuously extends across the entirety of the substrate with a uniform or varying thickness as measured along the Z axis.

One or more imprint layers 212 are then formed in step 164 on top of the seed layer 202 and subsequently patterned, as shown in medium 210 where imprint protrusions 214 are separated by open regions 216. The imprint pattern formed in step 164 may be produced with lithography, stamping, or punching to provide a predetermined width 218, depth 220, and shape of the protrusions 214 as well as an opening width 222. As a non-limiting example, step 164 can forcibly contact the imprint layer(s) 212 with a plate having the reverse pattern in order to create rectangular protrusions in one or more selected designs, such as protrusions oriented in radial vectors, rings, or lines, curved lines, or checkered patterns, throughout the substrate.

Next, step 166 removes residual imprint material in the open regions 216 via etching, such as reactive-ion etching (RIE) using $O_2$, to expose the seed layer 202, as shown in medium 230. The etching of step 166 further decreases the height and width of the protrusions 214 while oxidizing the exposed portions of the protrusion 214 and seed 202. The open regions 216 are subsequently filled in step 168 with a non-magnetic material 242, such as spin-on glass (SOG), as shown in medium 240. Step 168 also trims back any excessive non-magnetic material via a RIE etch, such as a $CF_4$ RIE etch, to expose a first fabrication surface 246 of each protrusion 214.

A first polymer brush layer 252 is deposited on top of the filled open regions 216 and in contact with the protrusion first fabrication surfaces 246 in step 170, as shown in medium 250. The non-magnetic material 244 serves to protect the shape and integrity of the protrusion sidewalls 244 during the deposition of the first polymer brush material 252. The composition of the first polymer brush layer 252 can be customized to be polar, non-polar, or neutral depending on the size of the protrusion pattern and the strategy of transferring the pattern into magnetic data dots.

It is noted that the polymer brush layer may consist of one or more different end-tethered polymer chains that promote fabrication of nanostructures, like the grafting of vertically aligned magnetic data dots 116. In other words, the first polymer brush layer provides an optimized condition for magnetic data dots to be created, as opposed to the imprint material.

Step 172 proceeds to remove the non-magnetic material 242 with a wet removal process, such as buffered oxide etching with a buffering agent like ammonium fluoride ($NH_4F$) or hydrofluoric acid (HF). Such wet removal process is quite harsh due to the imprint protrusions 214 and oxidized seed layer are inert to many buffering agents. At the conclusion of the wet removal process of step 172, as shown by medium 260, the open regions 216 are clear and a second fabrication surface 262 of the seed layer 202. With the non-magnetic material 242 previously protecting the open regions 216, the protrusion sidewalls 244 emerge from step 172 with as-formed shapes and sizes, such as the sidewall 244 being perpendicular to both the first 246 and second 262 fabrication surfaces.

Routine 160 advances to step 174 where a second polymer brush layer 272 is grafted onto the second fabrication surfaces 262, as shown in medium 270. The grafting of step 174 can be promoted by annealing the data storage medium at a relatively low temperature, such as less than 180° C., which allows the polymer brush material to selectively graft to the seed layer without reacting significantly with the imprint material 212 or the other polymer brush material 252.

With the grafting of the second polymer brush material to the second fabrication surface 262, the data storage medium 270 concurrently employs topographical and chemically contrasting patterns that allow block copolymer to be formed in step 176 as vertically aligned data dots 116 that are separated by non-magnetic material 282, as shown in medium 280. It is contemplated that an additional step 178 fabricates of one or more block copolymer etch masks followed by the deposition of a silicon containing block copolymer and polymeric top coat. Another optional step 180 may anneal the deposited block copolymer at temperatures above 180° C. to align the block copolymer material into data dots 116 before selectively removing organic block copolymer material to create an etch mask that allows pattern transfer into the seed layer 202 and substrate 204.

It can be appreciated that BPM can utilize chemically contrasting polymer brush materials to promote self-assembly of separate magnetic data dots. It is further appreciated that BPM can utilize topographical patterns to promote separation of self-assembled block copolymers. In the past, however, it has been difficult to construct a BPM with both chemically contrasting brush materials and topographically patterned surface due, at least in part, to the degradation of imprint sidewalls during lithography of the contrasting brush materials, as generally illustrated by FIG. 3. Hence, the materials and steps of routine 160 solve the previous difficulties and provide a directed self-assembled BPM with high data density due to the combination of topographical and chemical contrasts for the first 246 and second 262 fabrication surfaces.

Through the use of imprint lithography to generate topographical patterns and selective polymer grafting chemistry to independently control the surface chemistry of multiple different fabrication surfaces, block copolymers can self-assemble in vertical alignment despite high data density. As such, full spatial control of the surface chemistry and topography of fabrication surfaces can provide a BPM with data dots spaced with a period of 10 nm or less.

It will be appreciated that the technology described above can readily be utilized in any number of applications, including solid state memory. It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. A method comprising:
   depositing a seed layer on a substrate;
   forming an imprint layer atop the seed layer;
   patterning the imprint layer to form first and second patterned pedestals;
   deposit a non-magnetic material between the first and second patterned pedestals;
   create a first polymer brush layer atop each patterned pedestal and the non-magnetic material;
   remove the non-magnetic material and portions of the first polymer brush layer contacting the non-magnetic material to separate the first polymer brush layer into portions positioned on an elevated surface of each patterned pedestal; and
   deposit a second polymer brush layer atop the seed layer, the second polymer brush layer grafting to the material of the seed layer to position the second polymer layer only between the patterned pedestals.

2. The method of claim 1, wherein the imprint layer is stamped to produce the first and second patterned pedestals.

3. The method of claim 1, wherein residual portions of the imprint layer are removed by $O_2$ reactive-ion etching prior to the deposition of the non-magnetic material.

4. The method of claim 1, wherein excess portions of the non-magnetic material are removed via $CF_4$ reactive-ion etching prior to creating the first polymer brush layer.

5. The method of claim 1, wherein the first polymer brush layer is polar.

6. The method of claim 1, wherein the first polymer brush layer is non-polar.

7. The method of claim 1, wherein the first polymer layer is neutral.

8. The method of claim 1, wherein the substrate comprises silicon.

9. The method of claim 1, wherein the seed layer comprises chromium.

10. The method of claim 1, wherein each patterned pedestal has a linear sidewall oriented perpendicular to a top surface of the seed layer.

11. The method of claim 1, wherein each pedestal continuously extends at least to an elevated height above the seed layer.

12. The method of claim 1, wherein the second polymer brush layer is positioned only between the patterned pedestals and the first polymer brush layer is positioned only on an elevated surface of the respective patterned pedestals.

13. The method of claim 1, wherein the first and second polymer brush layers are physically separated by a sidewall of the respective patterned pedestals.

14. The method of claim 1, wherein the first and second brush layers are different materials.

15. A method comprising:
    depositing a seed layer on a substrate;
    forming an imprint layer atop the seed layer;
    patterning the imprint layer to form first and second patterned pedestals;
    deposit a non-magnetic material between the first and second patterned pedestals;
    create a first polymer brush layer atop each patterned pedestal and the non-magnetic material;
    remove the non-magnetic material and portions of the first polymer brush layer contacting the non-magnetic material with a buffered oxide etch to separate the first polymer brush layer into portions positioned on an elevated surface of each patterned pedestal;
    deposit a second polymer brush layer atop the seed layer, the second polymer brush layer grafting to the material of the seed layer to position the second polymer layer only between the patterned pedestals;
    deposit a silicon containing block copolymer material onto the first and second polymer brush layers; and
    annealing the block copolymer to self-assemble a plurality of separate magnetic domains aligned with either the first or second polymer brush layers.

16. The method of claim 15, wherein the magnetic domains form a bit patterned data storage medium.

17. The method apparatus of claim 15, wherein the magnetic domains are laterally separated from one another and each vertically aligned to form a data dot.

18. The method apparatus of claim 15, wherein the separate magnetic domains are segregated chemically and topographically by the patterned pedestals, first brush layer, and second brush layer. separated by 10 nm or less.

19. The method apparatus of claim 15, wherein the magnetic domains are separated by 10 nm or less.

* * * * *